(12) United States Patent
Lazzarini et al.

(10) Patent No.: US 11,548,226 B2
(45) Date of Patent: Jan. 10, 2023

(54) MACHINING CENTRE AND METHOD FOR MACHINING WORKPIECES

(71) Applicant: C.M.S. S.P.A., Zogno (IT)

(72) Inventors: Ramon Lazzarini, Paladina (IT); Nicola Rinaldi, Bergamo (IT)

(73) Assignee: C.M.S. S.p.A

( * ) Notice: Subject to any disclaimer, the term of this patent is extended or adjusted under 35 U.S.C. 154(b) by 0 days.

(21) Appl. No.: 17/118,804

(22) Filed: Dec. 11, 2020

(65) Prior Publication Data
US 2021/0178687 A1    Jun. 17, 2021

(30) Foreign Application Priority Data
Dec. 13, 2019  (IT) .................. 102019000023991

(51) Int. Cl.
*B29C 64/30* (2017.01)
*B33Y 10/00* (2015.01)
(Continued)

(52) U.S. Cl.
CPC .............. *B29C 64/30* (2017.08); *B22F 10/66* (2021.01); *B22F 12/22* (2021.01); *B29C 64/227* (2017.08);
(Continued)

(58) Field of Classification Search
CPC .......... B22F 12/82; B22F 12/00; B22F 12/50; B22F 10/66; B33Y 30/00; B29C 64/20;
(Continued)

(56) References Cited

U.S. PATENT DOCUMENTS 10,675,813 B2 * 6/2020 Bettermann .......... B29C 64/227
10,864,674 B2 * 12/2020 Adair .................... B29C 64/118
(Continued)

FOREIGN PATENT DOCUMENTS

DE          19533960 A1     3/1997
DE      102014015657 A1     4/2016
(Continued)

OTHER PUBLICATIONS

Espacenet machine translation of DE19633960 ("Celiker"), originally published 1997 (Year: 1997).*

*Primary Examiner* — Seyed Masoud Malekzadeh
*Assistant Examiner* — Jennifer L Groux
(74) *Attorney, Agent, or Firm* — Laubscher & Laubscher PC

(57) ABSTRACT

A machining centre comprising a machining plane; a subtractive unit for performing chip removal on a workpiece positioned on the machining plane; the subtractive unit comprising a first carriage that is slidable parallel to an operating axis; an additive unit arranged to perform machining by additive production techniques on the machining plane; the additive unit comprising a second carriage that is slidable along the operating axis. The additive unit is provided with a first coupling portion and said subtractive unit is provided with a second coupling portion couplable with the first coupling portion. In one step, the subtractive unit adopts a pick-up configuration in which the first coupling portion is coupled with the second coupling portion to connect the subtractive unit to the additive unit at least along the operating axis. In the pick-up configuration, the subtractive unit, connected to the additive unit, is configured to move the additive unit.

9 Claims, 12 Drawing Sheets

(51) Int. Cl.
    *B33Y 30/00*     (2015.01)
    *B29C 64/227*    (2017.01)
    *B33Y 40/20*     (2020.01)
    *B22F 10/66*     (2021.01)
    *B22F 12/00*     (2021.01)

(52) U.S. Cl.
    CPC ............... *B33Y 10/00* (2014.12); *B33Y 30/00* (2014.12); *B33Y 40/20* (2020.01)

(58) Field of Classification Search
    CPC ... B29C 64/205; B29C 64/188; B29C 64/194; B29C 64/209; B29C 64/227; B29C 64/232; B29C 64/236
    See application file for complete search history.

(56) References Cited

U.S. PATENT DOCUMENTS

| | | | |
|---|---|---|---|
| 2017/0246801 A1* | 8/2017 | Stodder | B29C 64/336 |
| 2017/0355141 A1* | 12/2017 | Bettermann | B27N 7/00 |
| 2018/0326660 A1* | 11/2018 | Gifford | B29C 64/241 |
| 2019/0118467 A1* | 4/2019 | Neboian | B29C 64/106 |
| 2019/0204811 A1* | 7/2019 | Adair | B29C 48/266 |
| 2020/0130264 A1* | 4/2020 | Fukase | B22F 10/20 |
| 2021/0096535 A1* | 4/2021 | Wigand | G05B 19/4097 |

FOREIGN PATENT DOCUMENTS

| | | | |
|---|---|---|---|
| EP | 3170620 A1 | 5/2017 | |
| EP | 3656501 A2 | 5/2020 | |
| TW | 1668073 B | 8/2019 | |
| WO | WO-2018172774 A1 * | 9/2018 | ............... B22F 10/00 |

* cited by examiner

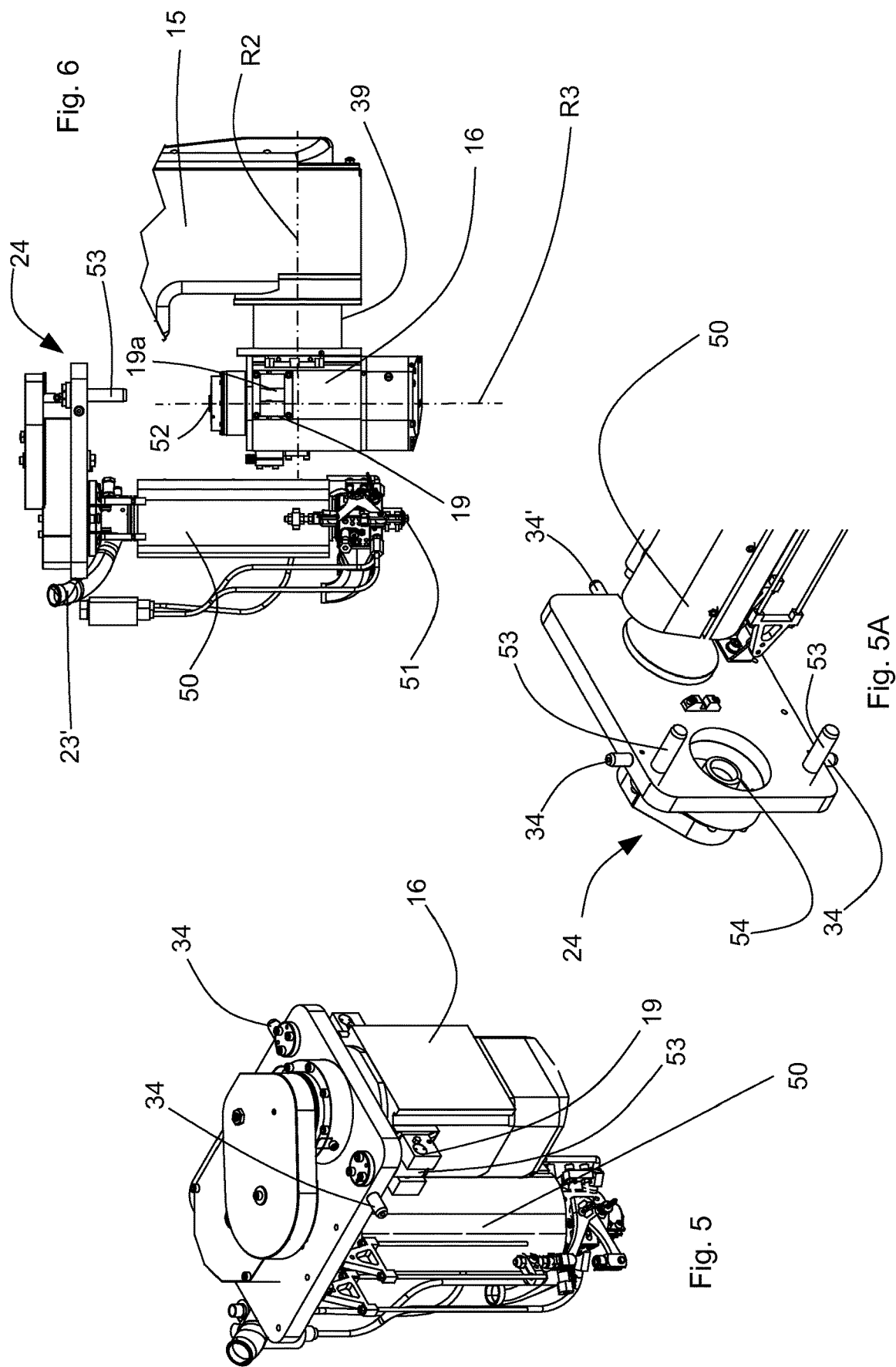

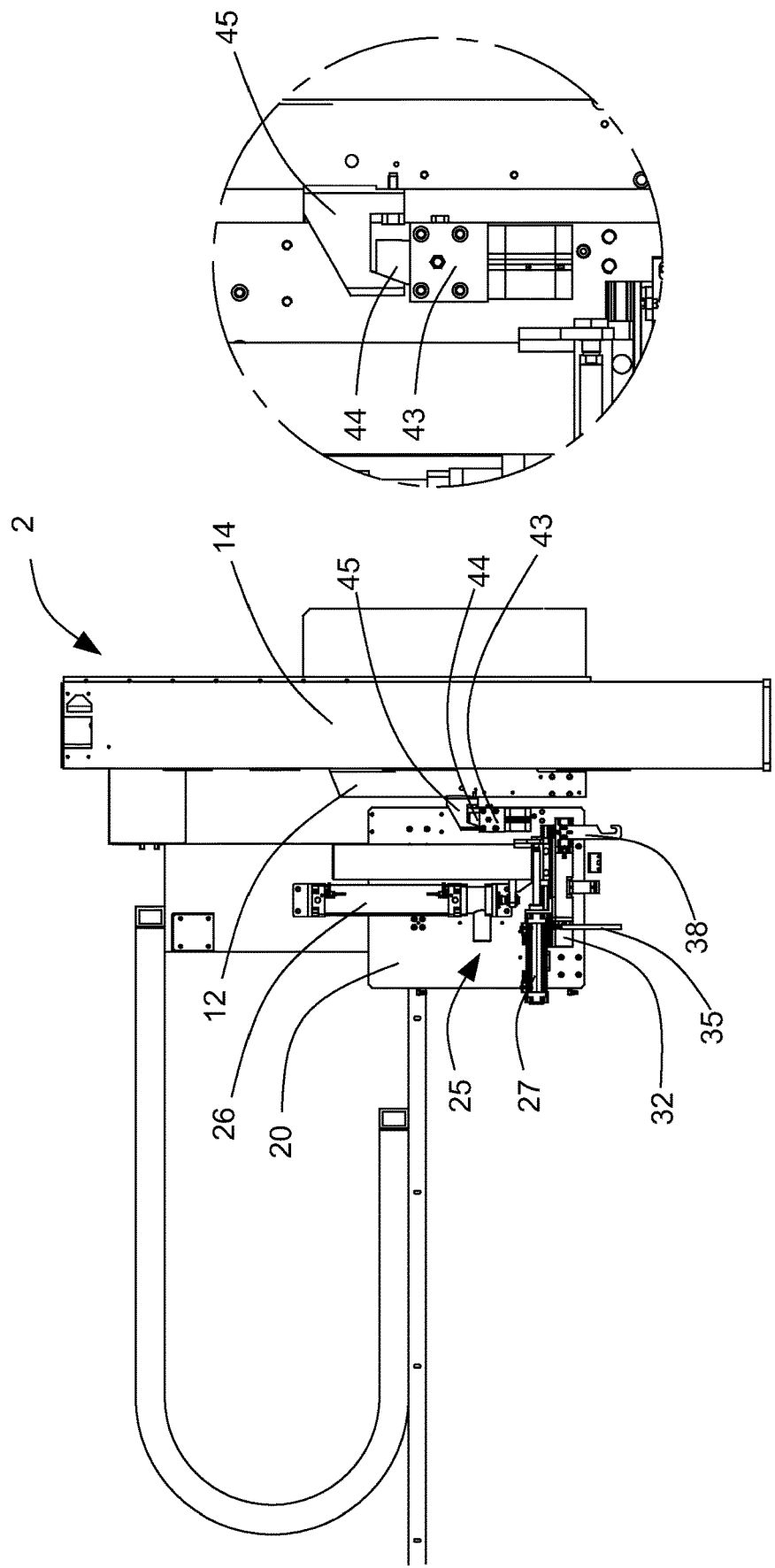

MACHINING CENTRE AND METHOD FOR MACHINING WORKPIECES

BACKGROUND OF THE INVENTION

The invention relates to a numerically controlled machining centre, to perform subtractive machining on a workpiece (in particular a workpiece made of ferrous metal, carbon or other composite materials, wood), or to perform additive machining.

In particular, the invention refers to a machining centre set up to perform machining by chip removal, such as milling, for example milling of whole workpiece, milling of edges, milling for making a decorative pattern; the machining centre is further set up to perform additive machining, i.e. to produce parts of components or semifinished products by 3D printing techniques.

The machining centre can adopt a subtractive configuration, in which the additive unit is not operating and the subtractive unit can carry a tool for removing material from the workpiece, and at least one additive configuration, in which the motorised subtractive unit is connected to the additive unit with the possibility of driving the additive unit.

The invention thus relates to a method for picking up, moving and releasing such a unit in the aforesaid machining centre.

Machining centres are known that are provided with a conveying unit that is movable on a machining plane along an axis X and an axis Y of a tern of axes X, Y, Z arranged transversely, in particular orthogonally, to one another.

The conveying unit can comprise an upright element, which is mounted slidably on a portal structure of the machining centre. The conveying unit is connected to one or more drivable motors to move the conveying unit substantially along the axes X and Y and along another axis Z of the trio of axes X, Y, Z.

The machining centre further comprises a magazine provided with one or more seats for housing machining devices, like for example a spindle, or an extrusion/3D printing unit.

The spindle or alternatively the 3D printing device can be connected to the upright element. In other words, the spindle can be mounted on the upright element, if it is desired to perform subtractive machining, or the extrusion/3D printing unit, if it is desired to perform additive machining.

The spindle is provided with a connecting grip arranged for housing and/or rotating a work tool.

When the spindle is connected to the upright element, the spindle can rotate the tool to perform machining by chip removal from the workpiece. The spindle is also motorised, can be adjustable in rotation around two rotation axes, one parallel to one of the axes X or Y, another parallel to the other axis Z.

Alternatively, the extrusion/3D printing unit can be connected to the upright element when the machining centre adopts an additive configuration. The extrusion/3D printing unit is provided with a feeder, comprising for example electric connections, pressure and temperature sensors, heating elements suitable for heating and fluidizing the material, cooling pipes, and so on. Before using the extrusion/3D printing unit, electric power nevertheless is required to be supplied to the feeder. On the upright element energy supplying means is thus mounted, which is connected manually to the feeder when the extrusion/3D printing unit is picked up by the conveying unit.

The time taken by an operator to connect the feeder to the energy supplying means is significant. Downtime or waiting time is added to this, before the feeder is ready to perform the additive machining. For example, it is necessary to wait for the heating elements to reach the prescribed operating temperature after they have been connected to the energy supplying means. This translates into longer production times.

The extrusion/3D printing unit is further provided with pipes for the transit of material to be moulded that are connected to further transit pipes provided on the conveying unit.

The transit pipes for the material are connected each time the machining centre adopts an additive configuration and are disconnected when the machining centre adopts a subtractive configuration. When the transit pipes are disconnected, part of the material to be moulded remains inside the pipes and, in contact with the air and the humidity present in the surrounding environment, often deteriorates and thus may not be suitable for being moulded.

Machining centres are further known, comprising a subtractive unit arranged to perform machining by chip removal from a workpiece positioned on the machining plane. The subtractive unit is motorized to move along the axes X and/or Y and/or Z. The subtractive unit comprises an upright element to which a spindle is connected; the spindle is arranged to rotate a tool for removing chip from the workpiece.

The machining centre further comprises an additive unit arranged to perform machining by additive production techniques on the machining plane. The additive unit is motorized to move along the axes X and/or Y and/or Z. The additive unit comprises a hopper arranged to receive and contain, at least temporarily, a quantity of material to be moulded, and an extrusion unit connected to the hopper and arranged to extrude the material machining plane in a heated and fluid state.

The additive unit can move on the machining plane independently of the subtractive unit.

Such a machining centre is structurally complex; the costs of stalling and running the subtractive unit and the additive unit are high, and managing the movements of the two units is cumbersome, above all because of the overall dimensions.

SUMMARY OF THE INVENTION

One object of the invention is to improve the machining centres of known type for performing subtractive machining by chip removal or additive machining by 3D printing.

One object of the invention is to simplify one step of picking up, moving and releasing an additive unit arranged to perform machining by additive production techniques in the machining centre.

One object of the invention is to reduce the complexity, and the costs of installing and running the machining centre.

One object of the invention is to reduce downtime, i.e. non-operational/waiting periods, of the machining centre.

One object of the invention is to provide a machining centre that is able to adopt an additive configuration in which the additive unit and the subtractive unit have overall relatively compact overall dimensions.

One advantage is to pick up and/or release in a shorter time and in a simplified manner an additive unit arranged to perform machining by additive production techniques.

One advantage is to prepare the additive unit before the additive unit is picked up by the subtractive unit.

One advantage is to make available a coupling portion that is simple to make and drive to couple the subtractive unit and the additive unit in an operating step.

One advantage is to preserve over time and avoid deterioration of the material that is suitable for being moulded by additive production techniques.

In one embodiment, a machining centre comprises a subtractive unit arranged to perform chip removal on a workpiece positioned on a machining plane, the subtractive unit comprising a first carriage that is slidable along an operating axis and is connected to a motor unit that is drivable to move the motor unit along this axis. The machining centre further comprises an additive unit arranged to perform machining by additive production techniques on the machining plane, the additive unit comprising a second carriage that is slidable along the same operating axis as the first carriage of the subtractive unit. The additive unit is provided with a first coupling portion and the subtractive unit is provided with a second coupling portion couplable with the first coupling portion; in one operating step the subtractive unit adopts a pick-up configuration in which the first coupling portion is coupled with the second coupling portion to connect the subtractive unit to the additive unit along this operating axis; in this pick-up configuration the subtractive unit is configured to move the additive unit along this operating axis.

In one embodiment, a method is implemented to pick up and move, in a machining centre, an additive unit arranged to perform machining by additive production techniques; the method comprises the steps of connecting the additive unit to a subtractive unit arranged to perform chip removal from a workpiece, and of moving the subtractive unit connected to the additive unit with respect to the machining plane along at least one operating axis. The step of connecting comprises coupling a first coupling portion, mounted on the additive unit, with a second coupling portion, mounted on the subtractive unit, substantially parallel to this operating axis.

BRIEF DESCRIPTION OF THE DRAWINGS

The invention can be understood better and implemented with reference to the attached drawings that illustrate some embodiments by way of non-limiting example, in which:

FIG. 5 is a perspective view in a vertical elevation of a detail of the preceding figures in which a spindle of the subtractive unit is coupled with an extrusion unit of the additive unit;

FIG. 5A is another perspective view of the extrusion unit of FIG. 5;

FIG. 6 is a view in a vertical elevation of FIG. 5;

FIG. 11 is a view in a vertical elevation that shows another coupling along another operating axis of the first coupling portion with the second coupling portion;

FIG. 11A is a detailed view of FIG. 11;

DETAILED DESCRIPTION

With reference to the attached figures, a numerically controlled machining centre 1 is shown, usable in industries processing ferrous metal, carbon or other composite materials, plastics, wood or another similar material.

The machining centre 1 may adopt a subtractive configuration, i.e. perform chip removal from a workpiece. The machining centre 1 may also adopt an additive configuration, i.e. make an object or a part of an object or components or semifinished products or finished products through an additive 3D printing technology.

Figure 1:
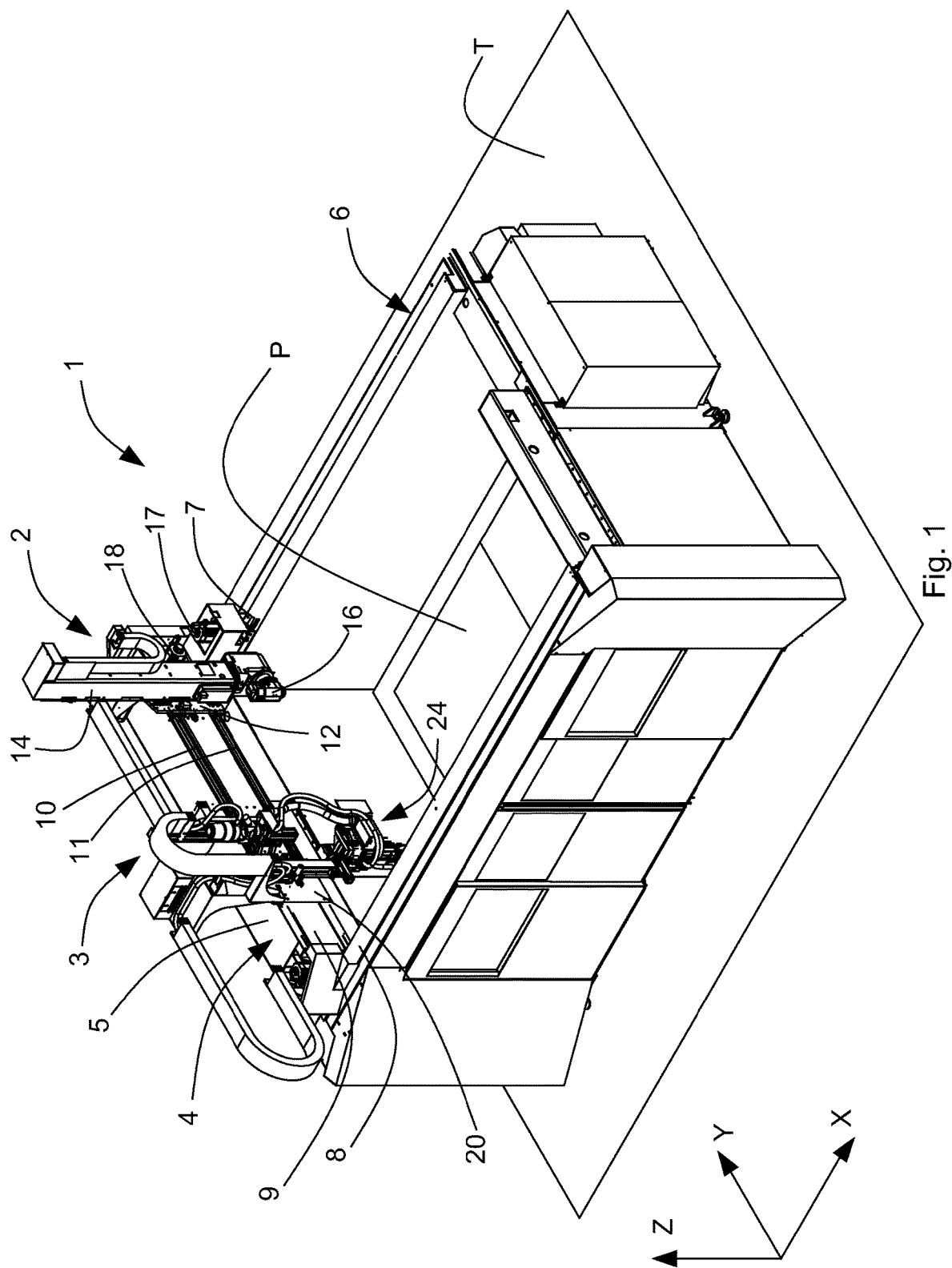
FIG. 1 is a perspective view of a machining centre according to the invention.
Figure 2:
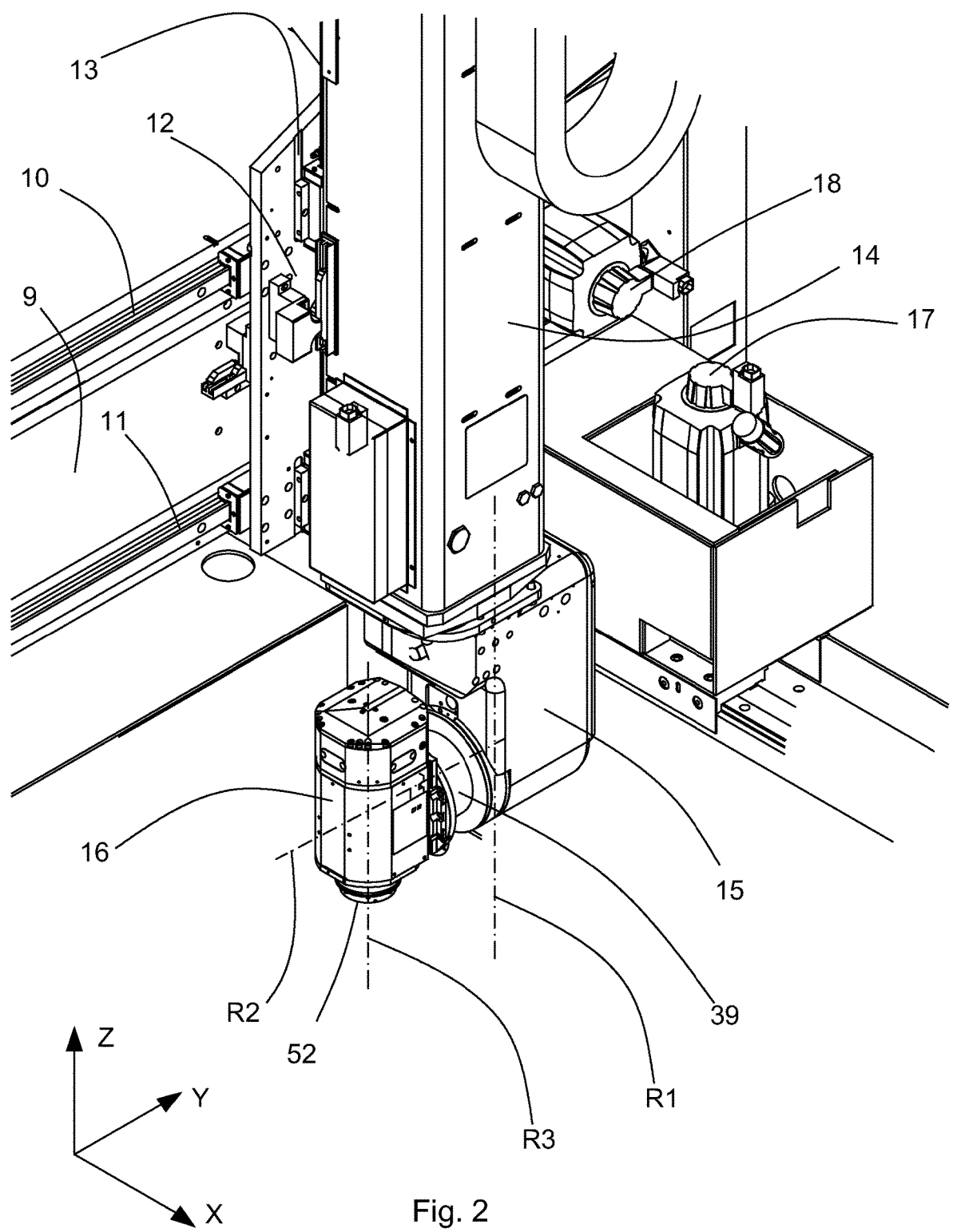
FIG. 2 is a detail in which a part of a subtractive unit of the machining centre of FIG. 1 is illustrated.

In FIG. 1 a machining centre 1 is shown, comprising a frame 6 that rests on a resting plane T. The frame 6, in a plan view, may have a shape like a quadrilateral, for example the shape of a rectangle. The frame 6 may further have a dimension substantially greater than another two dimensions. The frame 6 is provided with perimeter walls suitably for bounding a machining plane P on which a workpiece can be arranged, which is not shown, to be machined when the machining centre 1 adopts a subtractive configuration, or on which an object can be made when the machining centre 1 adopts an additive configuration.

On the machining plane P, a locking device may be arranged for locking the workpiece during machining by chip removal. The machining plane P may extend substantially along a pair of operating axes, for example an operating axis X, known below for the sake of simplicity also as axis X, and an operating axis Y, known below for the sake of simplicity also as axis Y. The axes X and Y are arranged transversely to one another and parallel to the machining plane P, the axis X and Y being part of a Cartesian tern of axes X, Y, Z.

On a wall of the frame 6, for example on a wall extending along the axis X, a first guide 7 may be obtained; in the same manner, on another wall of the frame opposite the aforesaid wall, a second guide 8 may be obtained. The first guide 7 and the second guide 8 may be parallel to one another and extend along the axis X.

The first guide 7 and the second guide 8 may slidably support a portal structure 4, which is movable along the axis X and extends parallel to the axis Y. The portal structure 4 is connected to a motor 17 of known type, which is drivable to move the portal structure 4 between two ends of the first 7 and of the second 8 guide. The portal structure 4 may have for example an upturned "L" shape, and comprises a crosspiece element 5 operationally positioned above the machining plane P.

The crosspiece element 5 extends substantially parallel to the axis Y. The crosspiece element 5 comprises a wall 9 or on which a third guide 10 and a fourth guide 11 are obtained. The third guide 10 and the fourth guide 11 extend substantially parallel to one another and to the axis Y, the third guide 10 is operationally positioned above the fourth guide 11.

On the portal structure 4, a subtractive unit 2 is mounted slidably. The subtractive unit 2 is arranged to perform machining by chip removal from a workpiece positioned on the machining plane P; the subtractive unit 2 is mounted slidably on the portal structure 4 and is motorized to slide along the axis Y and/or along another operating axis Z of the tern of axes X, Y, Z, the other operating axis Z being arranged transversely to the axes X and Y. Also in this case for the sake of simplicity, further on in the text the other operating axis Z can also be called the other axis Z.

The subtractive unit 2 may comprise a first carriage 12 that is movable along the axis Y; the third guide 10 and the fourth guide 11 support slidably the first carriage 12. The first carriage 12 is connected to a motor unit 18 of known type that is drivable to move this first carriage 12 between two ends of the third 10 and fourth 11 guides.

The first carriage 12 is provided with a fifth guide 13 extending substantially parallel to the other axis Z.

The subtractive unit 2 comprises an upright element 14 extending parallel to the other axis Z mounted slidably on the fifth guide 13; a connecting member 15 is connected rotatably to the upright element 14 to rotate around a first rotation axis R1. The first rotation axis R1 may be oriented parallel to the other axis Z.

The upright element 14 is connected to another motor unit, which is not shown, that is drivable to slide this upright element 14 on the fifth guide 13; the connecting member 15 is rotatable (by a connection to a motor unit which is not shown) around the axis of rotation R1.

The subtractive unit 2 may further comprise a spindle 16, for example an electric spindle, connected rotatably to the connecting member 15 by a collar element 39 to rotate around an axis of rotation R2. The aforesaid axis of rotation R2 may be parallel to the axis Y. The spindle 16 is rotatable around the axis of rotation R2.

The spindle 16 may comprise a power take-off 52 in which a tool may be housed and rotated, which is not shown, which is suitable for removing chips from the workpiece, for example a milling tool.

In the subtractive configuration, the subtractive unit 2 is a unit with five controlled axes, i.e. the spindle 16 is moved by the subtractive unit 2 substantially along the axis X by the portal structure 4, substantially along the axis Y by the first carriage 12, substantially along the other axis Z by the upright element 14, is rotated around the first rotation axis R1 by the connecting member 15 and rotates around the axis of rotation R2.

Peripherally, in particular on a face of the spindle 16, at least one receiving element 19 is mounted receivably, in particular a pair of receiving elements, as shown in FIGS. 5 and 6. The receiving elements 19 are mounted on two mutually opposite side faces of the spindle 16. The receiving element 19 comprises a concave surface 19a. The concave surface 19a may be semicircular and may act as a seat for housing an inserting element or a pin, as will be explained below.

The machining centre 1 further comprises an additive unit 3 arranged to perform machining by additive production techniques on the machining plane P. In other words, the additive unit 3 is arranged to produce workpieces, components or parts of components or semifinished products, by an additive technology, i.e. by 3D printing. The additive unit 3 is mounted on the portal structure 4 and is slidable parallel to the axis Y and to the other axis Z.

The additive unit 3 comprises a second carriage 20 mounted slidably on the third guide 10 and fourth guide 11 of the crosspiece element 5 and is movable along the axis Y. The additive unit 3 further comprises a hopper 21, which can be mounted on the second carriage 20; the hopper 21 is arranged to receive and contain, at least temporarily, a quantity of material that is suitable for being processed by 3D printing. For example, the hopper may receive plastics, like nylon, polyamide, ABS, PLA, or metal materials derived from aluminium, cobalt, titanium, gold, silver, stainless steels, composite materials and still others. The material may be further in the form of powder, filaments, pellets, granules, resins and so on. Inside the hopper 21, the aforesaid quantity of material may be standardized and possibly mixed with other materials, additives or dyes.

To the second carriage 20, a chain 22 may also be fixed arranged to contain a feeder, comprising for example a feeding pipe 23 connected to the hopper 21 and arranged to supply the hopper 21 with material for 3D printing. The feeder may also comprise electric cables, conduits for the transit of pressurized air or for cooling liquids, and so on that for the sake of visual clarity have not been illustrated.

The hopper 21 may be slidable on the second carriage 20 along the other axis Z. For example, the hopper 21 may be slidable on a guide, which is not shown, provided/obtained on the second carriage 20 and extending along the other axis Z. The hopper 21 may be provided with braking means arranged to prevent undesired movements of the hopper 21 along the other axis Z.

The additive unit 3 may comprise an extrusion unit 24 connected to the hopper 21 and arranged to extrude the material to be moulded on the machining plane P in a heated and fluid state. The extrusion unit 24 may be connected to the hopper 21 by another feeding pipe 23'. The feeding pipe 23' is flexible, as will be clearer subsequently.

The extrusion unit 24 may comprise a cylindrical container 50 (made for example of nitrided steel) inside which at least one feed screw can rotate, which is not shown, of known type.

The extrusion unit 24 may comprise a heater, for example electric resistors, arranged to heat the material. The heater may be positioned inside the cylindrical container and near an end portion thereof. Owing to the heat supplied by the heater and by the heat generated by the effect of the friction of the material with the inner walls of the cylindrical container 50, the material is taken to a fluid state.

The extrusion unit 24 may further comprise an extrusion nozzle 51 placed at one end of the cylindrical container 50, from which the material exits in fluid state, and a cooling unit, which is not shown, arranged to cool almost completely the cylindrical container 50. Owing to the cooling unit, the material is made fluid substantially in the end portion where the heater acts. The heater may be positioned near the extrusion nozzle 51.

The extrusion unit 24 is peripherally provided with protrusions, for example at least one protruding element extends parallel to the axis X and will be indicated by the numeric reference 34, at least another protruding element extends parallel to the axis Y and will be indicated by the numeric reference 34'.

The extrusion unit 24 may comprise (with reference to the other axis Z) a connecting portion 54 on a lower face thereof; this connecting portion is arranged to removably engage the power take-off 52 of the spindle 16, as will be explained below. The extrusion unit further comprises speed reducing members arranged to transmit the motion from the connecting portion 54 to the feed screw. The speed reducing members may for example comprise belts, pulleys, chains, and cogs. The extrusion unit 24 may further comprise peripherally a pair of inserting elements 53, extending parallel to the other axis Z and sized to engage removably the receiving element 19 of the spindle 16, in particular the concave surface 19a, during one operating step, as will be explained below. The inserting elements 53 may comprise tubular elements, for example pins.

Said additive unit 3 comprises a locking assembly 25 arranged to keep gripped and locked in position the extrusion unit 24, i.e. to prevent movement along the tern of axes X, Y, Z. The locking assembly 25 may further adopt a release configuration in which it frees the extrusion unit 24. In other words, the locking assembly 25 is movable between a locking configuration in which it locks in position the extrusion unit 24 and a release configuration in which it releases the aforesaid extrusion unit 24.

The locking assembly is fixed to the second carriage 20 and is connected to the extrusion unit 24.

The locking assembly 25 may comprise a first actuator 26 fixed to the second carriage 20 and extending along the other axis Z. The first actuator 26 may comprise an actuator of linear type, of mechanical type, or hydraulic type and so on. The first actuator 26 may comprise a stem 40, arranged inside a cylinder 41, and movable along a first sliding direction D1 parallel to the other axis Z. The first actuator 26 is thus drivable for moving the stem 40 in the first sliding direction D1 between two ends thereof.

The locking assembly 25 may further comprise a second actuator 27 connected to the first actuator 26 and arranged transversely to the latter. The second actuator may extend in a second sliding direction D2 parallel to the axis Y and may be structurally the same as the first actuator 26. The second actuator 27 thus comprises a stem 40' that is movable inside a cylinder 41'. The second actuator 27 is thus drivable for moving the stem 40' in the second sliding direction D2 between two ends of the cylinder 41'.

Figure 3:
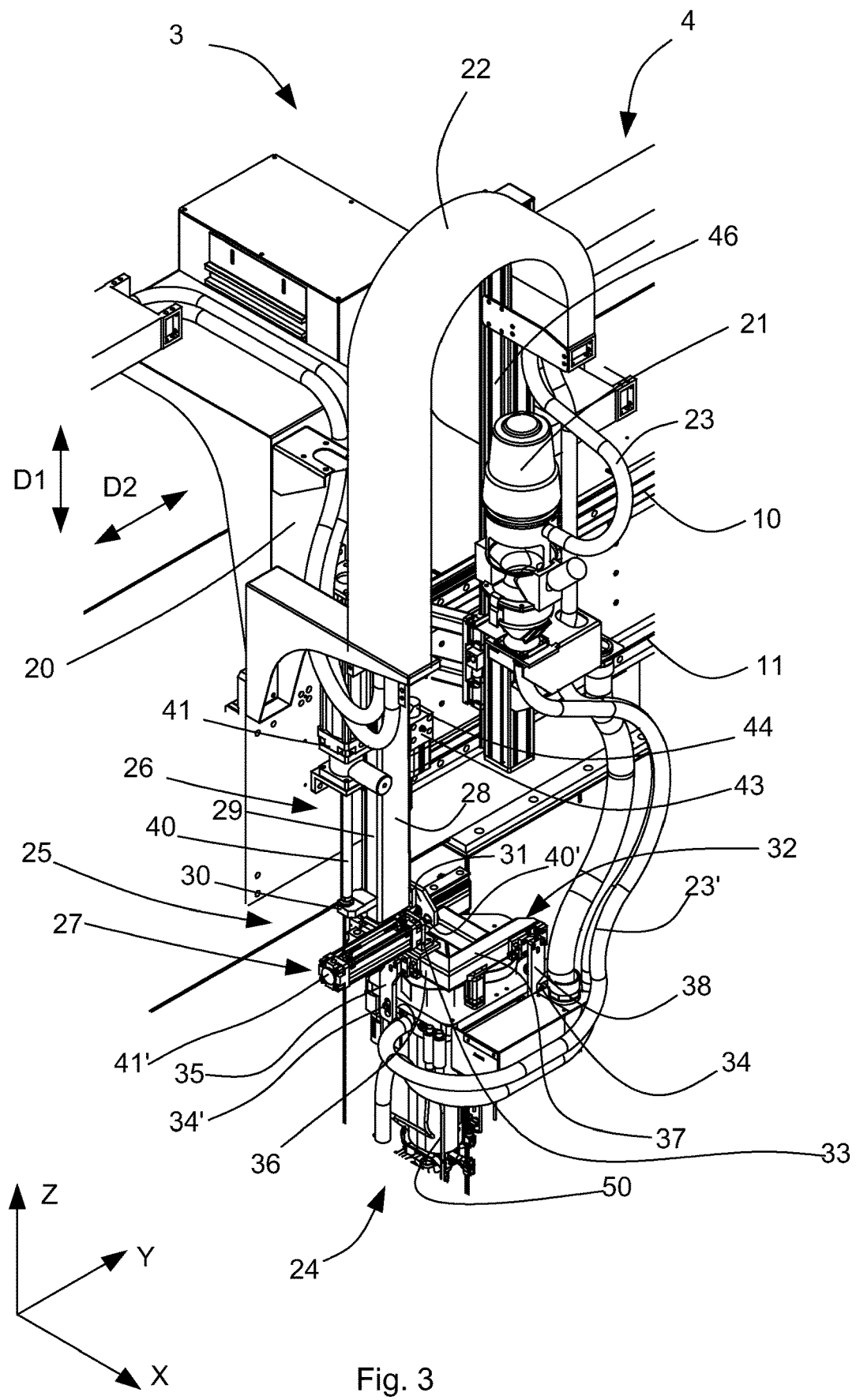
FIG. 3 is a detail in which a part of an additive unit of the machining centre of FIG. 1 is illustrated.
Figure 4:
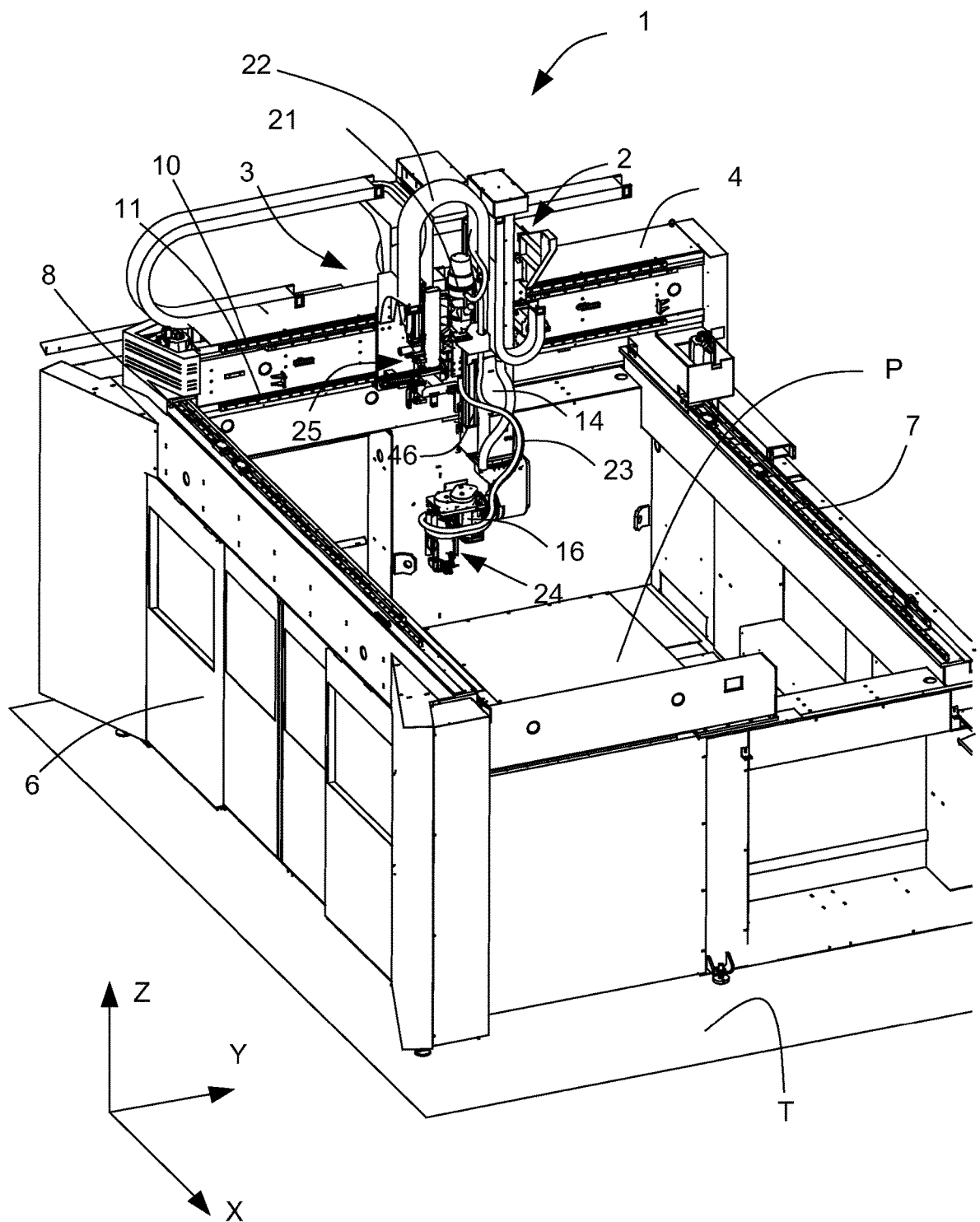
FIG. 4 is a perspective view of the machining centre of FIG. 1 in which the additive unit and the subtractive unit are connected/coupled.

The second actuator 27 may be connected to the first actuator 26 by an elongated element 28 that extends parallel to the other axis Z. With reference to FIG. 3, a face of the elongated element 28 may be connected (in a fixed manner) to an end portion of the stem 40 of the first actuator 26, and another face of the elongated element 28, may be connected (in a fixed manner) to an end portion of the stem 40' of the second actuator 27. The two faces of the elongated element 28 connected to the actuators may be mutually opposite.

The elongated element 28 may extend parallel to the other axis Z, a face 29 of the elongated element 28 may be connected to an end of the stem 40 of the first actuator 26 by a first blade 30, oriented parallel to the axis Y. On the first blade 30 a through hole may be obtained that is sized to insert the end of the stem 40. The stem 40 may be further fixed to the hole by fixing means, for example bolts or similar elements.

Similarly, the other face of the elongated element 28, which is not shown and opposite the face 29, may be connected to an end of the stem 40' of the second actuator 27 by a second blade 31 oriented transversely to the second actuator 27, for example parallel to the pair of axes X, Z. The second blade 31 may be fixed to the other face of the elongated element 28 by fixing means, for example screws and similar elements; on the second blade 31 a through hole may be obtained that is sized for inserting the end of the stem 40' of the second actuator unit 27 by fixing means, for example bolts or similar elements.

On the basis of the mounting constraints that have just been disclosed, the stem 40' of the second actuator 27 is locked in position; when the second actuator 27 is driven, the cylinder 41' thereof is free to move in the second sliding direction D2.

The locking assembly 25 may further comprise a supporting member 32 connected to the second actuator unit 27. The supporting member 32 may have a "U"-shaped plan shape; the supporting member 32 may comprise a base portion 36 extending parallel to the axis X and two arm portions 37 extending parallel to the axis Y, one of which is shown in FIG. 3.

The supporting member 32 may be fixed to the second actuator unit 27, for example to the cylinder 41' of the second actuator unit 27. In particular, the supporting member 32 is fixed to the second actuator unit by at least one third blade 33 shaped for example as an "L". A face of the third blade 33 may be in fact fixed to the cylinder 41' of the second actuator unit 27 and another face may be fixed to the supporting member 32 by known fixing means, for example screws, bolts and the like.

The actuator 26, 27, connected directly or indirectly to the supporting member 32, is drivable to move the supporting member 32 along the first sliding direction D1 and/or along the second sliding direction D2.

The supporting member 32 is provided with a locking device 35, 38 arranged to lock and maintain in position said extrusion unit, in particular to engage the protruding elements 34, 34' of the extrusion unit 24 that have been disclosed previously, so as to prevent undesired movements thereof, as explained below.

The locking device is mounted on the base portion 36 and/or on the arm portions 37, the locking device may comprise a plate 35 mounted on/fixed to the base portion 36 and extending parallel to the other axis Z. On the plate 35, a through slot is obtained arranged to engage the protruding element 34' provided on the perimeter of the extrusion unit 24 that extends parallel to the axis Y. The locking device may further comprise a hook plate 38 having a hook-shaped end portion shaped for engaging the protruding element 34 provided on the perimeter of the extrusion unit 24 that extends parallel to the axis X.

The first actuator 26 and the second actuator 27 are drivable along the first sliding direction D1 and/or along the second sliding direction D2 to move the supporting member 32 between a locking configuration, in which the locking device, respectively the plate 35 and the hook plate 38, is engaged with the protruding elements 34, 34', preventing the movements of the extrusion unit 24 (for example undesired oscillations or movements), and a release configuration, in which the locking device 35, 38 is disengaged from the protruding elements 34, 34'. In the release configuration the actuator 26 27 is in fact driven to move the supporting member 32 along the first D1 and/or the second sliding direction D2 so as to move the supporting member 32 away from the extrusion unit 24.

The additive unit 3 is provided with first coupling portion and the subtractive unit 2 is provided with second coupling portion; the latter is couplable with the first coupling portion.

In one operating step of the machining centre 1—for example when the machining centre adopts an additive configuration in which objects are made on the machining plane by additive production techniques—the subtractive unit 2 adopts a pick-up configuration in which it is connected to the additive unit 3. In the pick-up configuration, the first coupling portion is coupled with the second coupling portion. The subtractive unit 2, connected to the additive unit 3, is configured to move the additive unit 3 along the axis Y and/or along the other axis Z, as explained below. Further, the additive unit 3 is moved, connected to the subtractive unit 2 along the axis X by the portal structure 4.

The first coupling portion may comprise an actuator unit comprising for example a hollow body 43, for example a cylinder, and a piston 44. The actuator unit may be of the mechanical, hydraulic, pneumatic, electromechanical type and so on. The piston 44 may be housed in the hollow body 43 and may be movable inside the hollow body 43 along a direction parallel to the other axis Z. The piston 44 may have for example a cylindrical shape, or a frustoconical shape, or a pyramid shape. The piston 44 is movable inside the hollow body 43 between a lowered configuration in the piston 44 is substantially contained inside the hollow body 43 and a raised configuration in which the piston 44 protrudes from the hollow body 43. In the said operating step, the piston 44 adopts the raised configuration.

The hollow body 43/piston 44 may, by way of non-limiting example, be connected to/mounted on the second carriage 20. The hollow body 43/piston 44 may be connected to/mounted on the hopper 21.

The second coupling portion comprises a covering element 45 that may be mounted on the upright element 14, or alternatively on the first carriage 12. The covering element 45 may comprise a surface facing the machining plane P, on this surface, a recess 49 is defined having a set measured depth parallel to the other axis Z. The covering element 45 may engage with the piston 44, as explained below.

The recess 49 is sized to receive internally the piston 44. In the operating step in fact, the subtractive unit 2 is nearer the additive unit 3, the covering element 45 is substantially aligned along the other axis Z with the piston 44, the piston 44 is in raised configuration and engaged with the covering element 45, in particular with the recess 49.

In this manner, the subtractive unit 2 is connected to the additive unit 3 along the axis Y. Moving the subtractive unit 2 along the operating axis Y involves moving the additive unit 3 along the axis Y. In particular, the first carriage 12 may slide on the third guide 10 and fourth guide 11 of the portal structure 4 and drag with it the second carriage 20. Accordingly, the entire additive unit 3 may move along the operating axis Y.

The first coupling portion further comprises a connecting element 46 extending substantially in a direction parallel to the other axis Z. The connecting element 46 may comprise an elongated element, for example a bar or a tubular element.

The connecting element 46 may be mounted slidably on the second carriage 20 to slide along the other axis Z. The connecting element 46 may be further placed at a set distance from the second carriage 20 measured parallel to the axis X (for example by an arm structure, as shown in FIG. 3). The connecting element 46 is connected to the hopper 21.

The connecting element 46 is provided with at least one protruding portion 47 that extends in a direction parallel to the axis Y. The protruding portion 47 may comprise, for example, a tooth.

The second coupling portion comprises a housing plate 48. The housing plate 48 is also mounted on the upright element 14; operationally, the housing plate 48 is positioned below the covering element 45 along the other axis Z. Alternatively, it may be mounted on the first carriage 12.

The housing plate 48 comprises a surface facing the additive unit 3, a notch 42 being defined on said surface having a set depth parallel to the axis Y. The housing plate 48 may engage with the protruding portion 47.

During the operating step, the housing plate 48 is substantially aligned along the axis Y with the protruding portion 47 of the connecting element 46; the notch 42 further receives internally this protruding portion 47.

In this manner, the additive unit 3 is connected to the subtractive unit 2 along the other axis Z. Moving the subtractive unit 2 along the other axis Z involves moving the additive unit 3 along the other axis Z.

In particular, the upright element 14, by moving along the other axis Z, drags with itself the connecting element 46; accordingly also the hopper 21, the chain 22 and the feeding pipe 23 move along the other axis Z.

In the operating step, the supporting member 32 is disengaged from the extrusion unit 24; because the first 26 and/or the second actuator 27 have been driven to move the supporting member 32 along the first direction D1 and/or along the second sliding direction D2, and move the supporting member 32 away from the aforesaid extrusion unit 24.

The extrusion unit 24 is connected to/coupled with the spindle 16, as explained below. The spindle 16 is rotated by about 180° around the axis of rotation R2 with respect to the initial configuration; in the initial configuration, the spindle is oriented substantially parallel to the other axis Z and the power take-off 52 thereof faces the machining plane P. When the spindle 16 is rotated, the power take-off 52 is oriented upwards.

In the operating step, the extrusion unit 24 is substantially positioned next to the spindle 16, with reference to the axis Y. The extrusion unit 24, in particular, is connected stiffly to and engaged with the rotated spindle 16; each inserting element for inserting the pair of inserting elements 53 is engaged with the concave surface 19a of the receiving element 19 of the rotated spindle 16. Further, the connecting portion 54 is substantially aligned and engaged, along the other axis Z, with the power take-off 52.

Accordingly, if the upright element 14 is driven to move along the other axis Z, the rotated spindle 16 drags with itself the extrusion unit 24. Further, as already said previously, the upright element 14 drags with itself the connecting element 46 and the hopper 21, the chain 22 and the feeding pipe 23.

The distance between the extrusion unit 24 and the hopper 21, measured along the other axis Z, remains substantially constant whilst the hopper 21 and the extrusion unit 24 are moved along the other axis Z. The length of the feeding pipe 23' that connects the hopper 21 to the extrusion unit 24 remains substantially unvaried.

Figure 7:
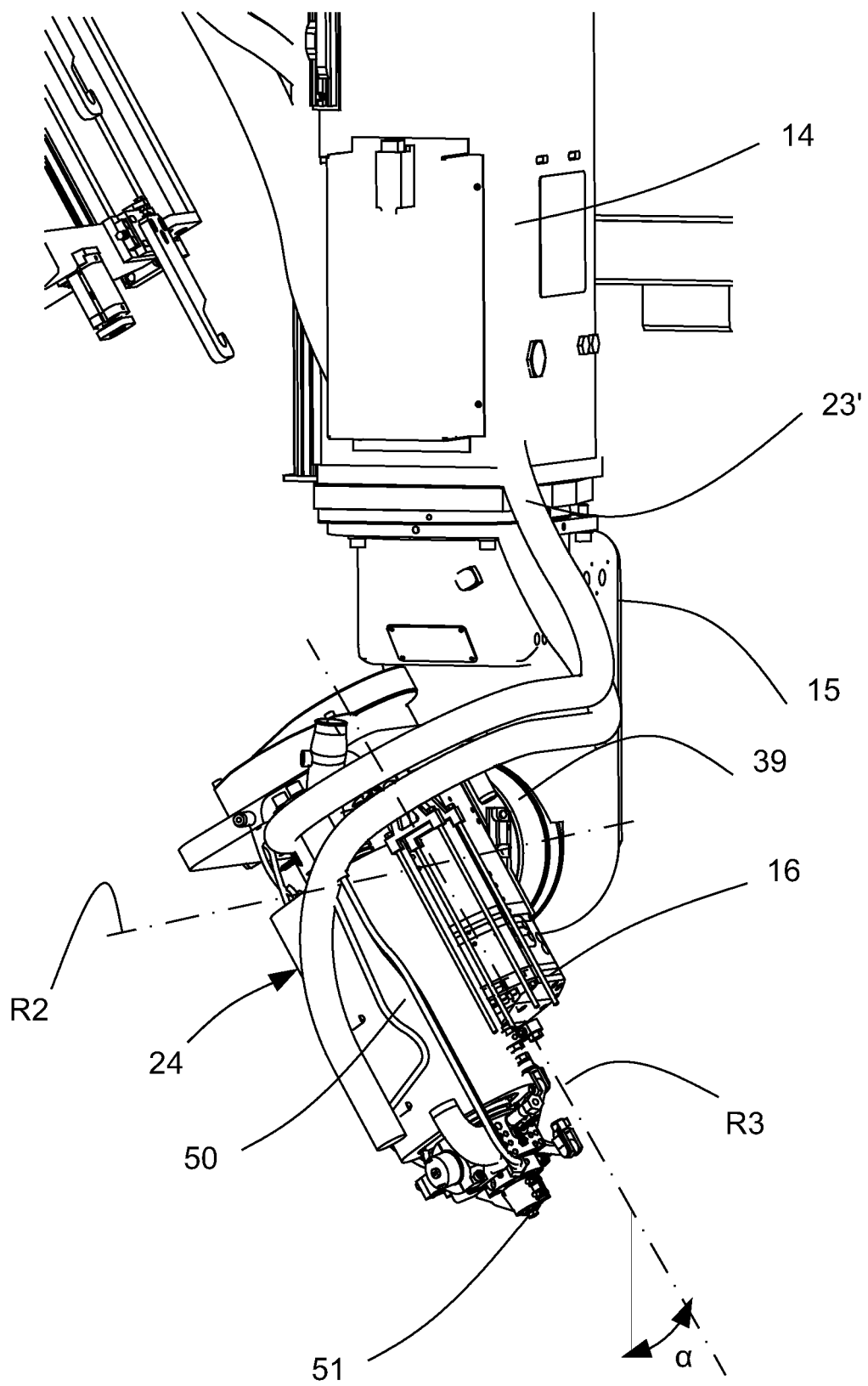
FIG. 7 is a detailed perspective view showing the spindle coupled with the extrusion unit in a rotated configuration.
Figure 10:
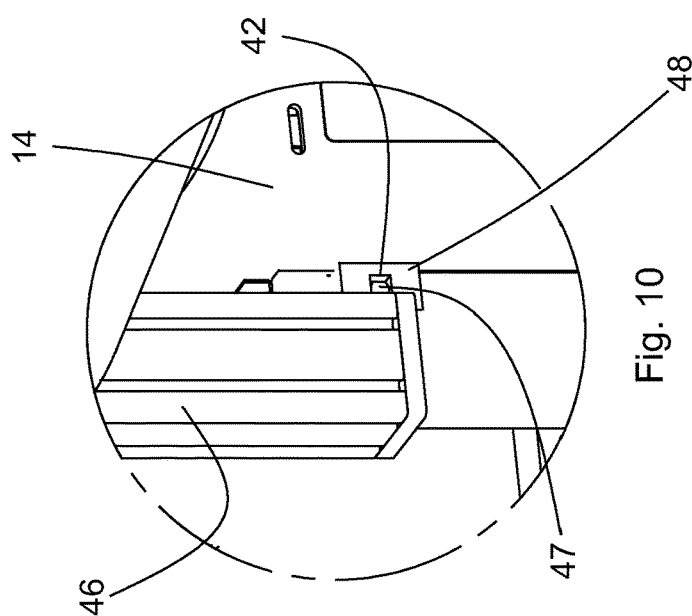
FIGS. 9 and 10 are detailed views of FIG. 8.
Figure 9:
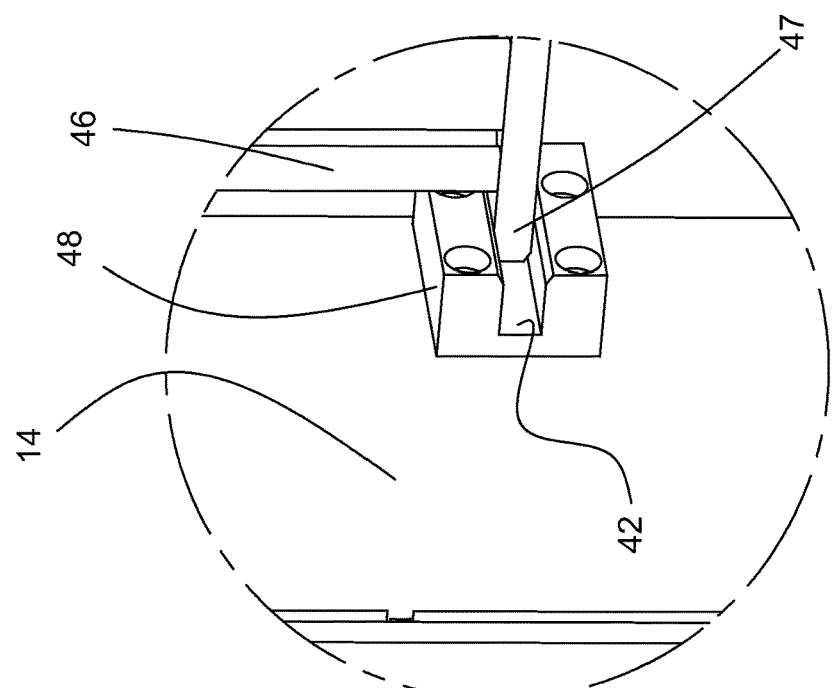
Figure 8:
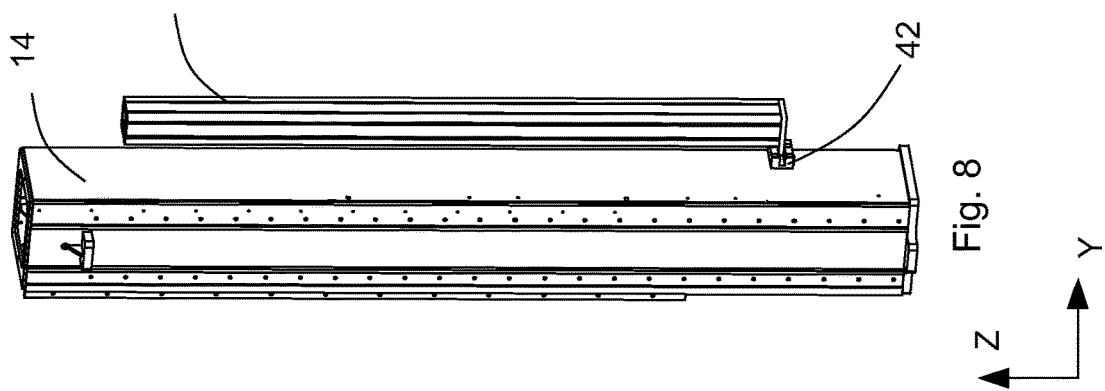
FIG. 8 is a detail of a coupling along an operating axis of the first coupling portion of the additive unit with the second coupling portion of the subtractive unit.

Being stiffly connected, a possible rotation of the spindle 16 around the axis of rotation R2 causes rotation of the extrusion unit 24 around this axis of rotation R2 by an angle of rotation a comprised between 0 and ±30°. In this case, the feeding pipe 23' undergoes a small elongation to make up for the rotation of the extrusion unit 24 around this axis of rotation R2. FIG. 7 shows in fact one step in which the spindle 16 and the extrusion unit 24 are rotated by an angle α around the axis of rotation R2 with respect to a substantially vertical direction.

As the connecting portion 54 is engaged along the other axis Z with the power take-off 52, by rotating the power take-off 52 around an axis of rotation of the spindle R3, rotation is transmitted to the feed screw around an axis of rotation parallel to this axis of rotation of the spindle R3, this rotation being suitably modulated by the speed reducing members.

To summarize, in the additive configuration, the additive unit 3 is a unit with five controlled axes, even if the movements along these five controlled axes are imposed by the subtractive unit 2.

The operation of the machining centre 1 (disclosed previously) may actuate a method to pick up and move the additive unit 3 with respect to the machining plane P.

The method may comprise one step of connecting the additive unit 3 to the subtractive unit 2 as explained below.

The additive unit 3 and the subtractive unit 2 are mounted slidably on the portal structure 4 that is movable substantially parallel to the axis X of the tern of axes (X, Y, Z) and extends substantially parallel to the axis Y.

Figure 12:
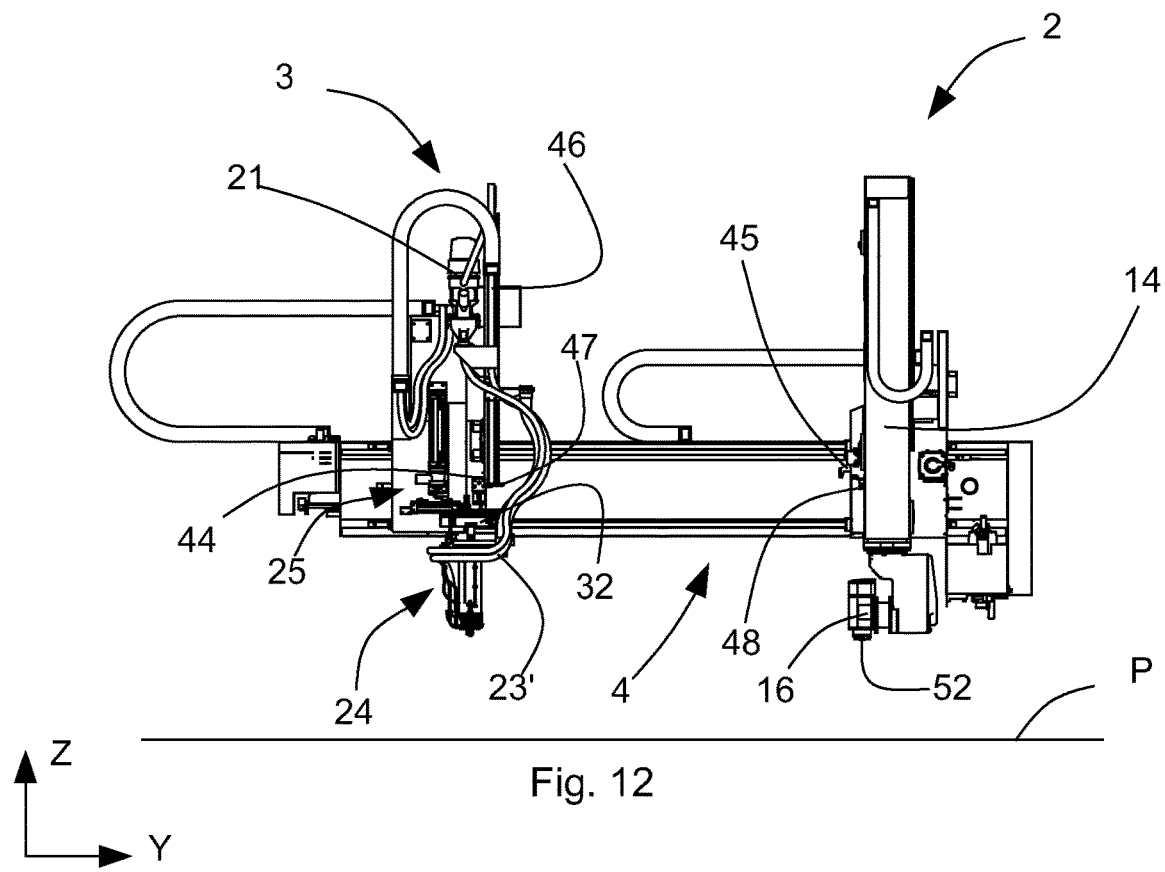
FIGS. 12 to 19 show some steps for picking up an additive unit by means of a subtractive unit and moving the additive unit to the machining plane.

In FIG. 12, one embodiment of a part of the machining centre 1 is shown, in particular of the portal structure 4 on which the subtractive unit 2 and the additive unit 3 are mounted slidably. The subtractive unit 2 and the additive unit 3 are spaced apart from one another in a direction parallel to the axis Y. The spindle 16 is further oriented substantially parallel to the other axis Z and the power take-off 52 faces the machining plane P. The extrusion unit 4 is further maintained gripped or locked in position by the locking assembly 25.

Figure 13:
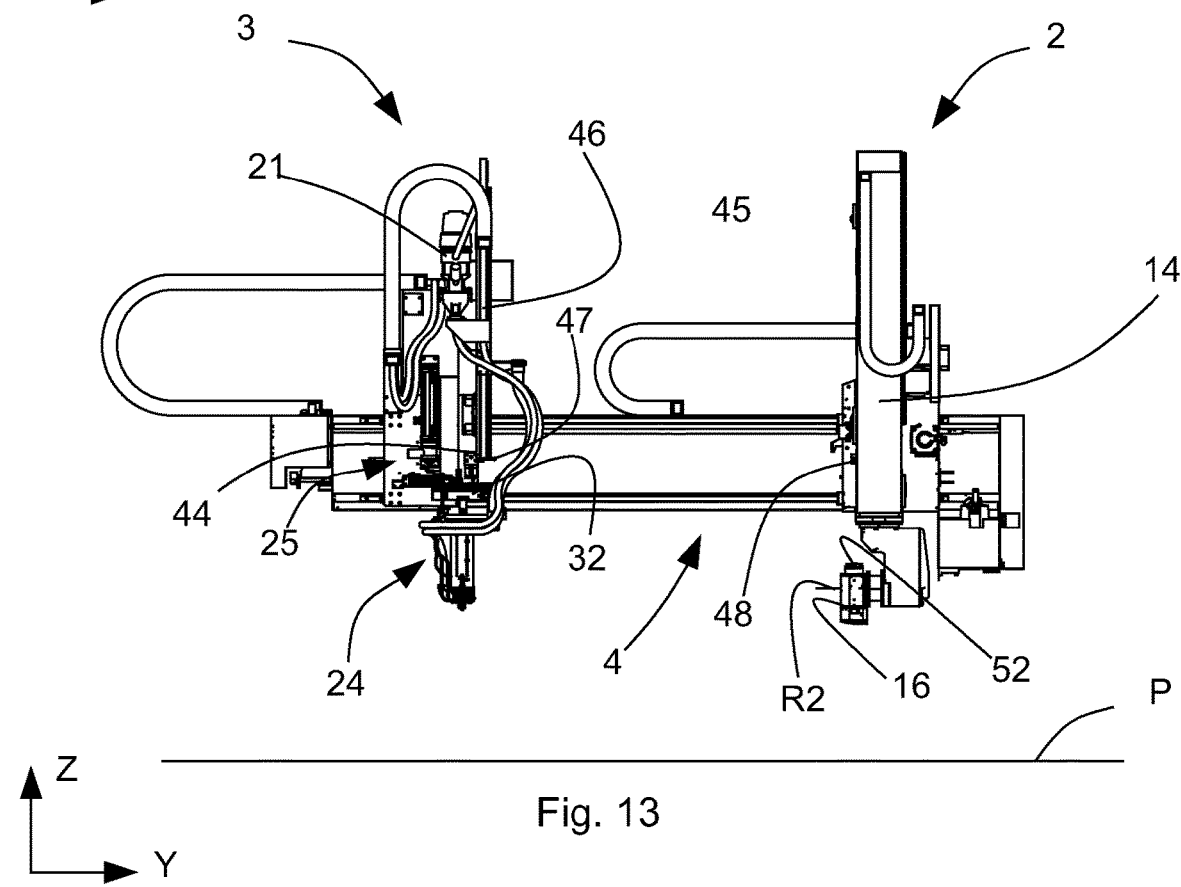

A step is provided of rotating the spindle 16 with respect to the axis of rotation R2 by about 180° such that the spindle 16 is oriented substantially parallel to the other axis Z and the power take-off 52 faces upwards, as shown in FIG. 13.

The step of connecting may comprise the step of sliding the subtractive unit 2 on the portal structure 4 substantially along the operating axis Y to bring the subtractive unit 2 up to the additive unit 3.

The step of connecting may comprise the step of bringing the subtractive unit 2 into contact with the additive unit 3.

Figure 14:
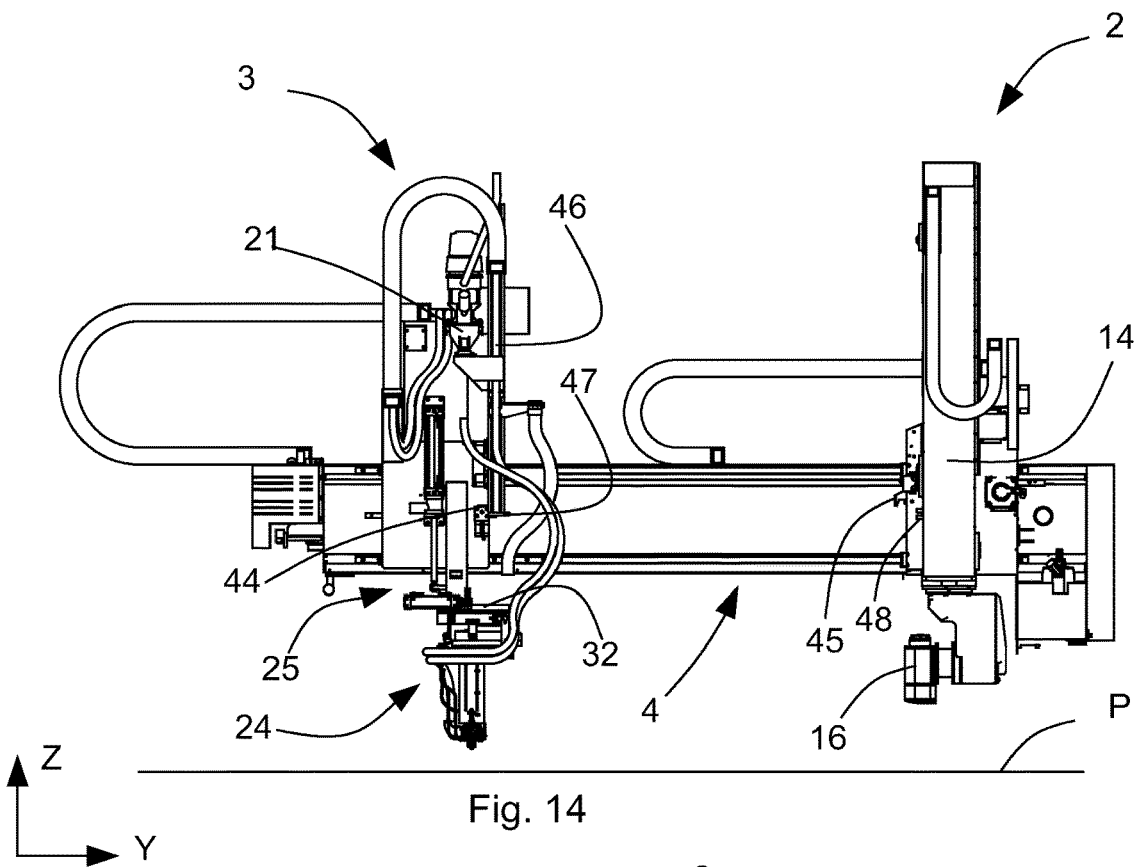
Figure 15:
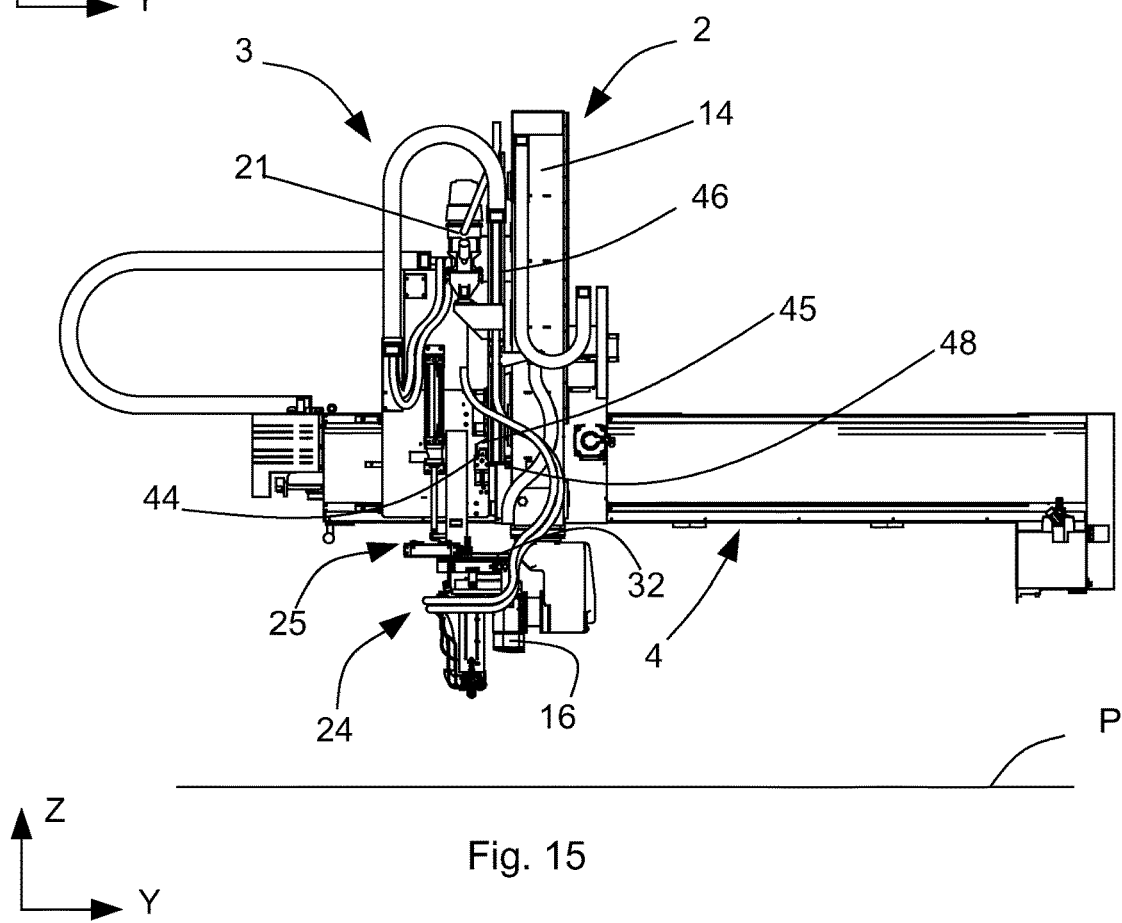

A step may be provided, for example before the subtractive unit 2 and the additive unit 3 are near, to adjust in position along the other axis Z the extrusion unit 24, or alternatively the spindle 16. For example, in FIG. 14 the extrusion unit 24 is adjusted in position with respect to the spindle 16 (or vice versa) along the other axis Z. Adjusting in position may comprise driving the first actuator body 26 to move the locking assembly 25, and thus also the extrusion unit 24, in the first sliding direction D1, downwards or upwards. Alternatively, adjusting in position may comprise moving the upright element 14, and accordingly the spindle 16, along the other axis Z.

By moving the extrusion unit 24 (or alternatively the spindle 16) before the subtractive unit 2 and the additive unit 3 are near, it is established that:
- the rotated spindle 16 is substantially alongside the extrusion unit 24 along the axis Y;
- the power take-off 52 of the spindle 16 and the connecting portion 54 of the extrusion unit are substantially aligned and brought alongside along the other axis Z;
- the inserting elements 53 of the extrusion unit 24 are substantially aligned with the receiving elements 19 of the spindle 16 along the other axis Z.

The extrusion unit 24 is thus coupled with the spindle 16 (or vice versa) to engage the power take-off 52 with the connecting portion 54 and to insert/engage the inserting elements 53 with the receiving elements 19. In this manner, the extrusion unit 24 and the spindle 16 are connected, i.e. coupled, along the axis Y and along the other axis Z.

When the subtractive unit 2 and the additive unit 3 are near, preferably when they are in contact, the first coupling portion mounted on the additive unit 3 can couple with second coupling portion mounted on the subtractive unit 2 along the aforesaid axis Y.

The housing plate 48, in particular the notch 42, is substantially aligned along the axis Y with the protruding portion 47 of the connecting element 46. When the subtractive unit 2 is in contact with the additive unit 3, the protruding portion 47 engages the housing plate, in particular the protruding portion 47 is engaged with the notch 42.

Being coupled along the operating axis Y, the protruding portion remains engaged in the notch 42 during movements of the subtractive unit 2 along the other operating axis Z; this coupling thus enables the subtractive unit 2 to be connected to the additive unit 3 along this other operating axis Z.

If the housing plate 48, in particular the notch 42, is not substantially aligned along the operating axis Y with the protruding portion 47 of the connecting element 46, a step may be provided of adjusting in position this housing plate 48, or this connecting element 46. For example, the upright element 14 may be moved along the other axis Z.

The step of connecting may further comprise the step of coupling the first coupling portion with the second coupling portion also along the other axis Z.

For the sake of greater clarity, when the subtractive unit 2 and the additive unit 3 are in contact, the actuator body (comprising the hollow body 43 and the piston 44) is substantially aligned along the other operating axis Z with the covering element 45. The actuator body is further near the covering element 45 along this other operating axis Z. In particular, the piston 44 is substantially aligned with and near the recess 49 along the other axis Z. Further, the piston 44 is in the lowered configuration, i.e. it is substantially contained inside the hollow body 43.

Coupling along the other axis Z thus comprises moving the piston 44 along the other axis Z and engaging the piston 44 with the recess 49 of the covering element 45.

Being coupled along the other operating axis Z, the piston 44 remains engaged in the recess 49 during movements of the subtractive unit 2 along the operating axis Y; this coupling thus enables the subtractive unit 2 to be connected to the additive unit 3 along this operating axis Y.

The step of connecting the subtractive unit 2 with the additive unit 3 further comprises the step of removing and disengaging the locking assembly 25 from the extrusion unit 24.

Figure 16:
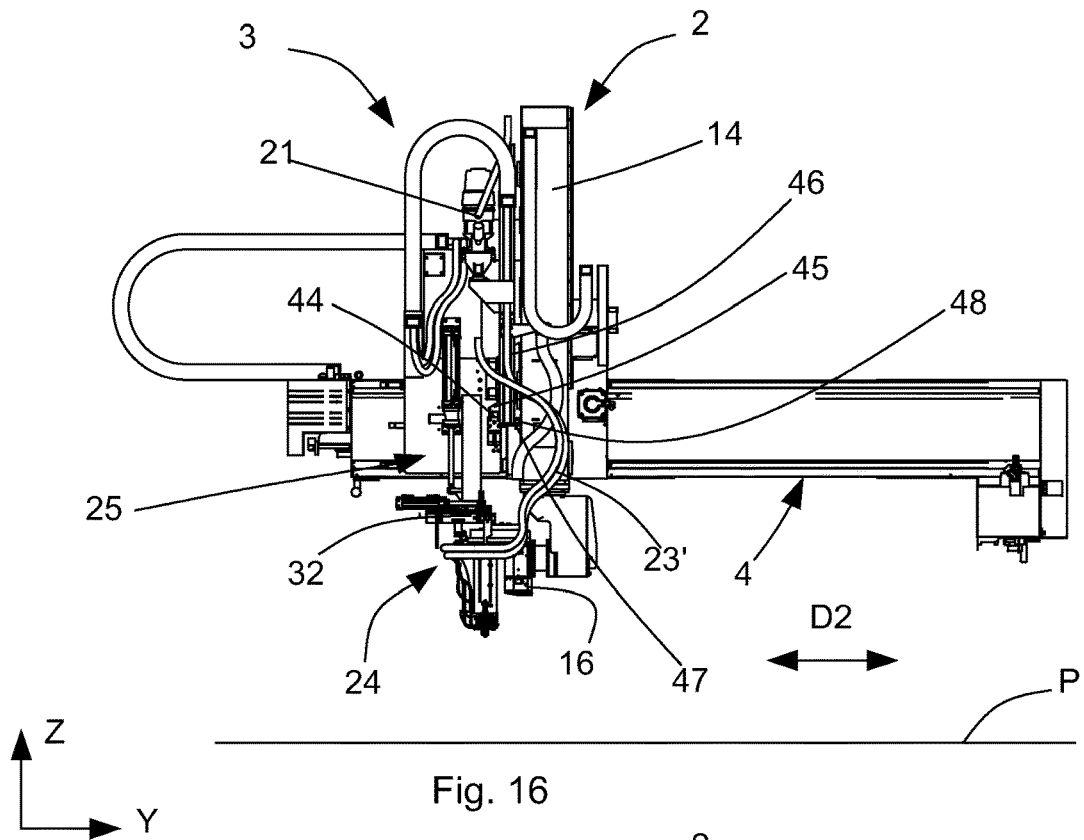
Figure 17:
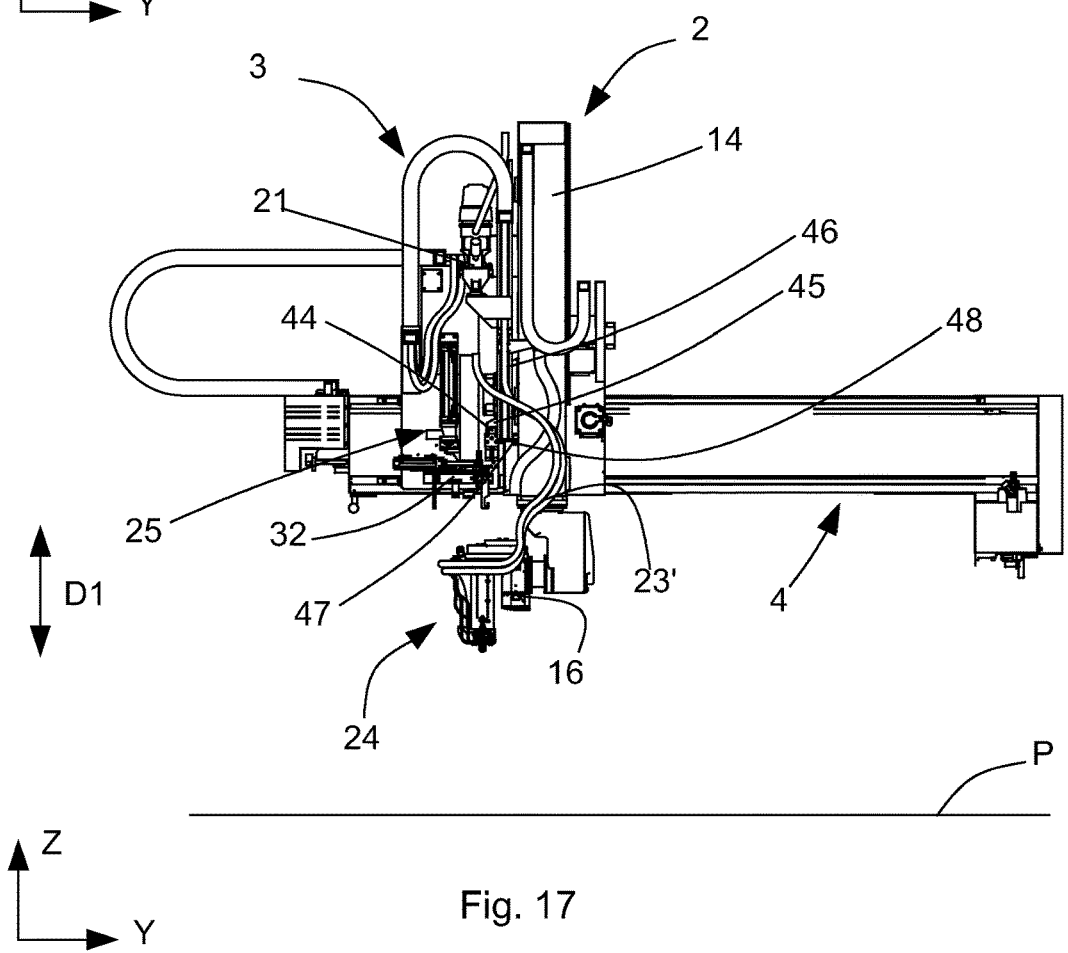
Figure 18:
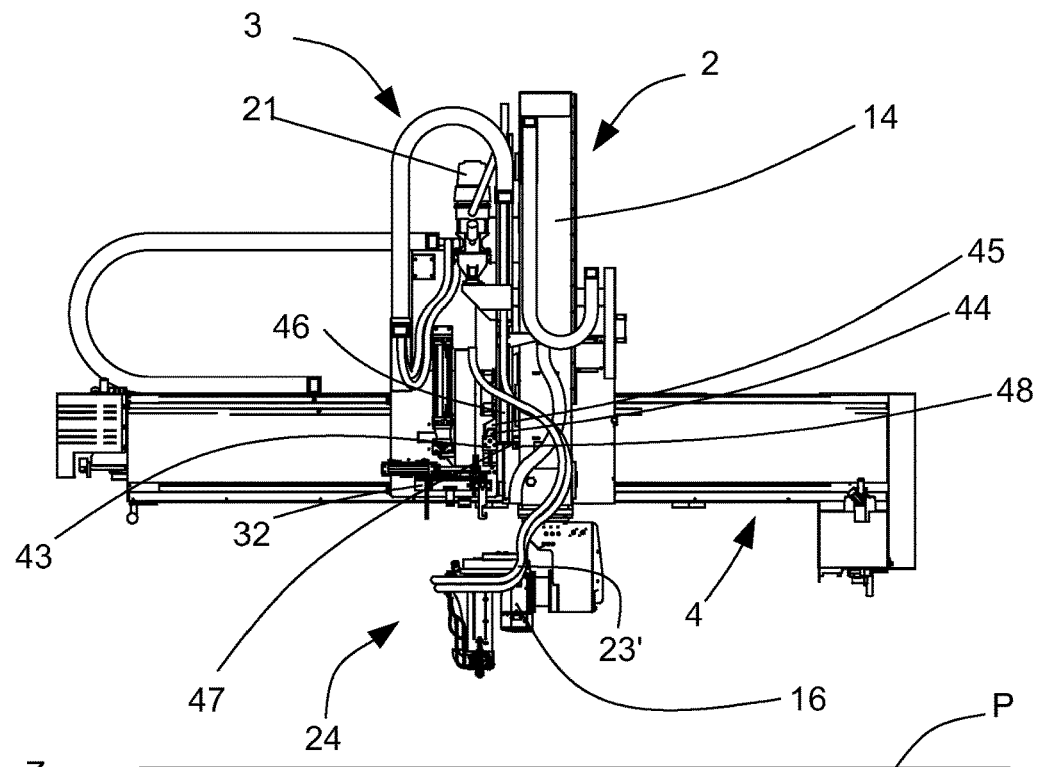
Figure 19:
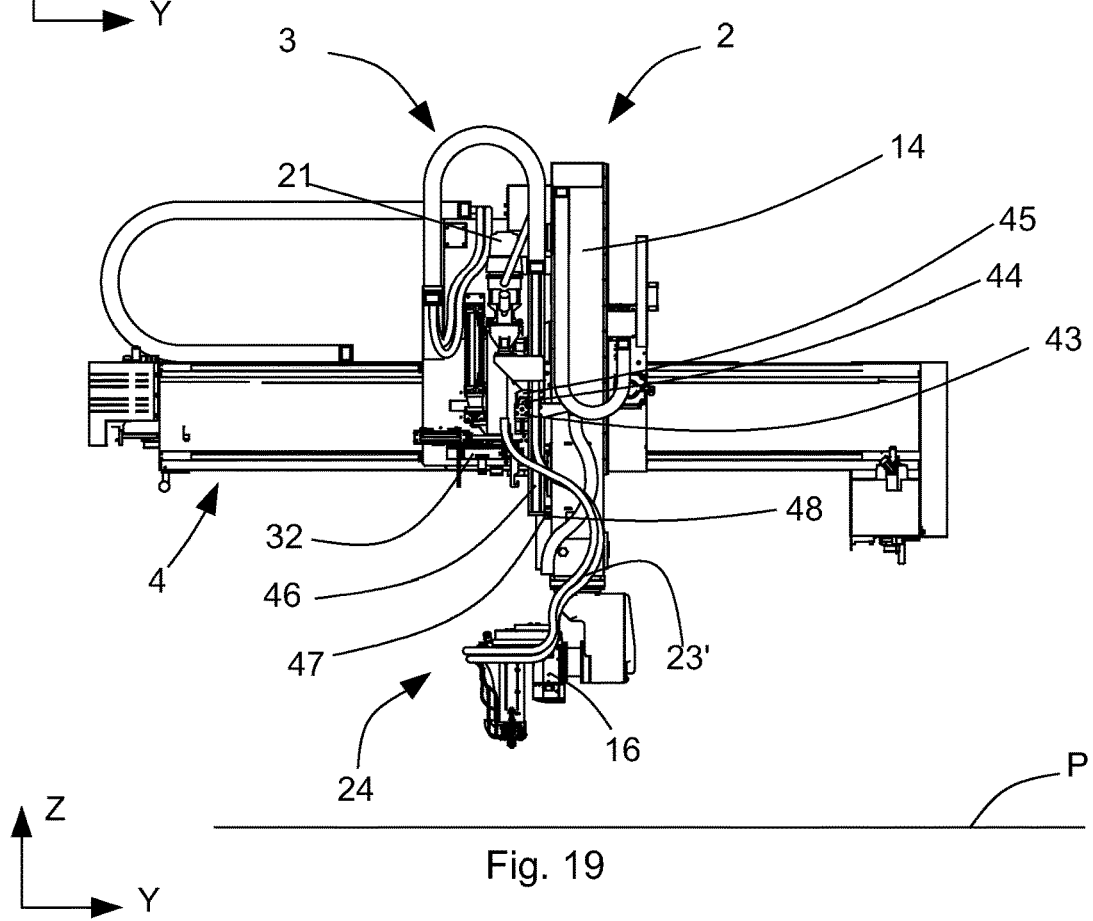

The locking assembly 25 is in fact arranged to lock and maintain in position the extrusion unit 24 and prevent a movement thereof along the tern of axes X, Y, Z. Moving away the locking assembly 25 comprises moving the supporting member 32 of the locking assembly 25 along the first sliding direction D1 and/or along the second sliding direction D2. Moving the supporting member 32 comprises driving the first actuator 26 in the first sliding direction D1 and/or the second actuator 27 in the second sliding direction D2. This step of moving away and disengaging the locking assembly 25 from the extrusion unit 24 is shown in FIGS. 16 and 17.

After the step of connecting the subtractive unit 2 with the additive unit 3 is completed, the step of moving the subtractive unit 2, connected to the additive unit 3, with respect to the machining plane P substantially parallel to the axis Y, and/or to other axis Z of the tern of axes X, Y, Z may be provided. As being connected, the subtractive unit 2 moves with itself the additive unit 3, the latter being devoid of connections to motor units.

When the subtractive unit 2 and the additive unit 3 are connected and when they move, the spindle 16 supplies the extrusion unit 24 for operation thereof. In other words, the power take-off 52 transmits a rotation motion to the connecting portion 54 and accordingly to the feed screw, which can move the material to be moulded to the extrusion nozzle 51.

In order to be clear, when the first carriage 12 of the subtractive unit 2 moves along the axis Y, the second carriage 20 of the additive unit 3 moves with the first carriage 12 by the coupling between the piston 44 and covering element 45.

Similarly, when the upright element 14 moves along the axis Y, the hopper 21 moves with the upright element 14 by the coupling between the connecting element 46 and the housing plate 48; the extrusion unit 24 further moves with the spindle 16 by the coupling between the inserting elements 53 and the receiving elements 19 (in addition between the power take-off 52 and connecting portion 54).

Moving the additive unit 3 by the subtractive unit 2 involves moving together substantially all the components of this additive unit, i.e. the second carriage 20, the extrusion unit 24, the hopper 21, the feeder, the heater and so on.

From what has been disclosed until now, it is possible to "make ready" the additive unit (to perform machining tasks by additive production techniques on the machining plane) before the additive unit is connected to the subtractive unit; this thus enables the downtime of the additive unit to be reduced, i.e. the time that the latter uses after receiving external stimulus to be ready to perform a new additive production task again.

For example, during one rest step of the additive unit (i.e. when it is disconnected from the subtractive unit), the heater of the extrusion unit, although it is not operating, can remain connected to energy supplying means; accordingly, it can be programmed to drive the heater already for a given time before the additive unit is connected to the subtractive unit, so as to preheat the extrusion unit.

Further, owing to the invention, the material to be deposited on the machining plane remains inside the feeding pipes (in a closed and isolated circuit) when the additive unit is in the rest step; this stops this material from coming into contact with the surrounding environment, for example with the humidity present in the surrounding environment, and getting ruined.

Moving the additive unit (devoid of motors) by the subtractive unit, and transmitting motion to the extrusion unit by driving the spindle also enables the installation and operation costs of further motor unit to be reduced that are to be connected to this additive unit. Also the overall dimensions are reduced.

The invention claimed is:

1. A machining centre, comprising:
a machining plane;
a subtractive unit arranged to perform chip removal on a workpiece positioned on said machining plane, said subtractive unit comprising a first carriage that is slidable along an operating axis and a spindle;
a motor unit connected with said subtractive unit and operable to displace said first carriage along said operating axis;
an additive unit arranged to perform machining by additive production techniques on said machining plane, said additive unit comprising a second carriage that is slidable along said operating axis, an extrusion unit, and a locking assembly arranged to maintain said extrusion unit in a gripped and locked position;
said additive unit including a first coupling portion and said subtractive unit including a second coupling portion couplable with said first coupling portion; in one operating step said spindle being removably coupled with said extrusion unit and said subtractive unit adopting a pick-up configuration in which said first coupling portion is coupled with said second coupling portion to connect said subtractive unit to said additive unit to move said additive unit along said operating axis and said locking assembly releasing said extrusion unit from said gripped and locked position.

2. The machining centre according to claim 1, wherein said subtractive unit is slidable along a further operating axis that is transverse to said operating axis.

3. The machining centre according to claim 2, wherein said additive unit is slidable along said further operating axis.

4. The machining centre according to claim 2, wherein, in said pick-up configuration, said first coupling portion is further coupled with said second coupling portion to connect said subtractive unit to said additive unit to move said additive unit along said further operating axis.

5. The machining centre according to claim 2, wherein said subtractive unit comprises an upright element that is slidable parallel to said further operating axis, and wherein said additive unit comprises a hopper that is slidable parallel to said further operating axis and a feeder connected to said hopper; in said operating step, said upright element being connected to said hopper and to said feeder; in said operating step, said upright element being configured to move said hopper and said feeder along said further operating axis.

6. The machining centre according to claim 2, wherein said first coupling portion comprises a piston that is movable along said further operating axis and said second coupling portion comprises a covering element; in said operating step said piston being engaged with said covering element along said further operating axis to connect said subtractive unit to said additive unit along said operating axis.

7. The machining centre according to claim 2, wherein said first coupling portion further comprises a connecting element provided with at least one protruding portion that extends in a direction parallel to said operating axis, and said second coupling portion comprises a housing plate; in said operating step said protruding portion being engaged with said housing plate along said operating axis to connect said subtractive unit to said additive unit along said further operating axis.

8. The machining centre according to claim 2, wherein said locking assembly comprises a supporting member placed in contact with said extrusion unit to maintain said extrusion unit in said gripped and locked position, and an actuator connected to said supporting member; in said operating step said actuator being driven to move said supporting member parallel to said operating axis and/or said further operating axis that is transverse to said operating axis.

9. The machining centre according to claim 8, wherein said extrusion unit is peripherally provided with protruding elements and said supporting member is provided with a locking device shaped to engage with said protruding elements; in said operating step said locking device being disengaged from said protruding elements.

* * * * *